United States Patent
Buecher et al.

(10) Patent No.: US 9,310,227 B2
(45) Date of Patent: Apr. 12, 2016

(54) MULTI-CHANNEL ROTARY ENCODER

(71) Applicant: Hengstler GmbH, Aldingen (DE)

(72) Inventors: Johann Buecher, Aldingen (DE); Uwe Grigo, Donaueschingen (DE); Wolfgang Klaiber, Hausen ob Verena (DE); Martin Linden, Wellendingen (DE)

(73) Assignee: HENGSTLER GMBH, Aldingen (DE)

( * ) Notice: Subject to any disclaimer, the term of this patent is extended or adjusted under 35 U.S.C. 154(b) by 0 days.

(21) Appl. No.: 14/411,617

(22) PCT Filed: Jun. 26, 2013

(86) PCT No.: PCT/EP2013/001877
§ 371 (c)(1),
(2) Date: Dec. 29, 2014

(87) PCT Pub. No.: WO2014/000885
PCT Pub. Date: Jan. 3, 2014

(65) Prior Publication Data
US 2015/0160045 A1   Jun. 11, 2015

(30) Foreign Application Priority Data

Jun. 28, 2012 (DE) .......................... 10 2012 012 870

(51) Int. Cl.
*G01D 5/245*    (2006.01)
*G01D 5/347*    (2006.01)

(52) U.S. Cl.
CPC .............. *G01D 5/3473* (2013.01); *G01D 5/245* (2013.01); *G01D 5/2454* (2013.01); *G01D 5/34776* (2013.01)

(58) Field of Classification Search
CPC ... G01D 5/2455; G01D 5/2454; G01D 5/246; G01D 5/245; G01D 5/3473
See application file for complete search history.

(56) References Cited

U.S. PATENT DOCUMENTS 6,433,539 B2 * 8/2002 Gaessler ....................... 324/174
7,244,929 B2    7/2007 Rodi (Continued)

FOREIGN PATENT DOCUMENTS

| DE | 19513692 C1 | 7/1996 |
|---|---|---|
| DE | 19727352 A1 | 1/1998 |
| DE | 10244583 A1 | 4/2004 |
| DE | 10360042 A1 | 7/2005 |

(Continued)

OTHER PUBLICATIONS

Sick/Stegmann, Description of the HIPERFACE, Interface, 78166 Donaueschingen, 03-05, http://www.stegmann.com/prodcut/servo/datasheets/1045.pdf, Nov. 7, 2013.

*Primary Examiner* — Tony Ko
(74) *Attorney, Agent, or Firm* — Browdy and Neimark, PLLC

(57) ABSTRACT

Method for operating a multi-channel rotary encoder comprising at least one printed circuit board on which one or a plurality of functional units (1, 1a, 1b, 1c, 2, 3, 4) are arranged as integrated components and are interconnected, at least one position transducer (6, 7) generating absolute and incremental measurement values which are each fed to a control unit (5) by means of at least one channel (37, 38), the control unit being disposed as a management and safety monitoring unit and controlling a downstream-connected machine, wherein the rotary encoder consists of at least three functional units (1, 2, 3), that the position transducer (6) is arranged in a first functional unit (1) and generates absolute location-position values (9) in this functional unit (1), which are fed by a second functional unit (2), which is connected as an interface, as first secure data (39) by means of the first secure channel (37) to the control unit (5), and that the position transducer (6) feeds its incremental measurement values to a third functional unit (3) which generates absolute location-position values (8) by calculation and feeds said values (8) through the second functional unit (2) by means of a second secure channel (38) as second secure data (40) to the control unit (5) (FIG. 1).

5 Claims, 7 Drawing Sheets

(56) References Cited

U.S. PATENT DOCUMENTS

2001/0006344 A1 7/2001 Gaessler et al.
2015/0123586 A1* 5/2015 Yoshida ............... G01D 5/3473
                                                    318/640

FOREIGN PATENT DOCUMENTS

| | | |
|---|---|---|
| EP | 0800059 A1 | 10/1997 |
| EP | 2098930 A1 | 9/2009 |
| EP | 2233889 A1 | 9/2010 |

* cited by examiner

MULTI-CHANNEL ROTARY ENCODER

The invention relates to a multi-channel rotary encoder according to the preamble of patent claim 1.

A variety of rotary encoders with highly diverse designs and functions are known. The invention thus relates to rotary encoders which operate according to the optical scanning principle of a multi-channel encoded disc but also to rotary encoders which operate capacitively, or inductively, or magnetically.

For the secure transmission of the signals generated by the rotary encoder, it is known to design the rotary encoder with multiple channels. In other words, one type of measuring signal is transmitted by means of a first channel and another type of measuring signal is transmitted by means of a second channel to a control unit. Moreover, the invention is not limited to a two-channel rotary encoder. Therefore, the invention also relates to rotary encoders which have more than two channels for transmitting measurement data. For simplification purposes only, the following description proceeds from a two-channel measurement data transmission, even though the invention is not limited to such transmission.

With such rotary encoders, the aspects of cost saving, space requirement, and secure data transmission have priority with regard to the type and use of the printed circuit board used.

As of yet, it is only known to arrange specific functions of structural or functional units of a rotary encoder on a printed circuit board with separate components which is disadvantageous because the components, which are electrically connected to one another solely by means of the traces of the printed circuit board, can be damaged or their contact members are unreliable, and so a transmission of the measuring signals to a downstream-connected control unit can lead to unreliable results. As a rule, such components are highly integrated circuits (chips) designed as ASIC.

Therefore, the invention addresses the problem of further developing the different functional units of a multi-channel rotary encoder of the initially described type such that costs can be saved and the space requirements of the printed circuit board of the rotary encoder can be minimized while increasing the safety of the data transmission.

This problem is solved by the technical teaching of claim 1 of the invention.

The essential feature of the invention is that of combining different functional units of the rotary encoder, thus allowing for a higher level of integration which allows for a better solution in terms of cost and space.

In particular, the invention relates to a two- or multi-channel rotary encoder which is to be used to ensure the drive of a secure machine in terms of functional safety. The aim is to determine whether possible errors are present in the complete system. The system consists of the rotary encoder and the machine, e.g. a machine tool or a different production machine.

The aim of a secure system according to the invention is that of detecting whether the rotary encoder is transmitting incorrect information to the control unit, thus possibly causing an unsafe condition of the entire machine. Therefore, two channels are available which are subsequently assessed by the control unit (CU), and with specific comparison mechanisms, it is possible to determine whether one of the two channels or both channels are corrupt or faulty.

$1^{st}$ Embodiment

Separation into Three Functional Units

In a first embodiment, the secure system, according to the invention, consists of three functional units, wherein functional unit 1 and functional unit 3 are the sensor functional groups which realize the two independent channels. Functional unit 2 is an interface which transmits the data for analysis to the control unit by means of the two channels which are independent from one another.

For this embodiment and all other embodiments, it is important that each functional unit is a separate component (e.g. in the design as ASIC) and the three aforementioned three components are preferably arranged on a common printed circuit board.

With reference to the first embodiment, the two channels are separated in components which are separate from one another (functional units 1 and 3) for the measurement value acquisition and its processing, wherein a third component (functional unit 2) is used, which, as mere interface, only transmits the two channels to the control unit for analysis.

$2^{nd}$ and $3^{rd}$ Embodiment

Separation into Two Functional Units

In a second embodiment, the secure system, according to the invention, consists of two functional units, wherein functional unit 1 and functional unit 2 are the sensor functional groups which realize the two independent channels. However, functional unit 2 is also designed as an interface which transmits the data for analysis to the control unit.

In a preferred embodiment, a diagnostic unit is implemented in each of the functional units 1 and 2.

Such a diagnostic unit is each associated with a measurement value channel and performs a variety of tests of the measurement values acquired on this channel. These tests include, e.g. memory test or checksum calculations.

The singular examination of the data of a channel does not yet reveal which channel is corrupt. It is only revealed that the data are not consistent. A comparison of the two channels only reveals that the data do not mach.

In the CU, in which the two channels are brought together, the two channels are compared. If the CU detects a deviation of the data of one channel from the data of the other channel, the machine is deactivated or the machine switches over to the secure state. For that purpose, either power is cut off from the drives or brakes are activated, and so the machine can no longer perform any dangerous movement.

The invention is advantageous because no decisions are generated by the CU as to which channel feeds redundant data and which channel does not; instead, everything is combined in a single position measuring system and therefore externally positioned sensors and such can be foregone.

The entire multi-channel measurement value acquisition system is integrated in a single unit—preferably in a single printed circuit board with a number of functional units designed as ASICs installed on such printed circuit board.

It is thus an at least two-channel unit, in which two channels are redundant to each other and supply data which are redundant to each other.

The first and the second embodiment differ from one another in that a higher level of integration is achieved with the second embodiment.

In the second embodiment, the separate functional unit 3 is no longer required. Instead, this functional unit 3 is integrated in the functional unit 2. In the first embodiment, the third functional unit was designed purely as a transmission interface while the second embodiment provides a higher integration, i.e. the second functional unit is now also integrated in the third functional unit serving as interface.

It applies to all embodiments that two different types of rotation angle or length information can be acquired from the actual sensor (which can be designed so as to be optical, magnetic, capacitive, or inductive). One channel is associated with the absolute measurement values, and the second channel is associated with the incremental measurement values. The incremental channel is transmitted to the (interface) function block 2 and processed in said function block to a location information with the required diagnostic information.

Channel 1 continues to be integrated in the functional unit 1 which provides the absolute signal values and, in conjunction with a diagnostic unit analyzing the measurement values, this information is compiled in the functional unit 1. Subsequently, this information is channeled through the interface block (functional unit 2) in accordance with the black channel principle and fed to the CU for analysis.

In each of the functional units, the position value of the rotary encoder is formed twice on channels which are each electrically separate from one another.

This ensures that similar errors on both channels are not analyzed without detection. For such reason, the two measurement-value detecting function blocks, according to the invention, are implemented in separate ASICs.

If, by contrast, the two function blocks detecting the measurement values were to be implemented in a single ASIC, the two function blocks in the single ASIC could potentially interfere with and influence each other.

This would result in the risk of generating similar error sources (common course) which leads to an undetected change of the information and which would subsequently no longer be detectable in the CU.

Therefore, the invention provides for measurement value acquisition and diagnosis in spatially and electrically separate components. Thus, two independent measurement values are generated.

The analysis of the first measurement value generation is fed through the second function block, and so the two channels arrive redundantly in the CU and show the same values.

The control unit controls the drive and provides a secure analysis which recognizes whether any errors are present. Once errors are present, the downstream-connected machine is deactivated.

It is characteristic in the second and third embodiment that the channel 2 is now integrated in the interface chip. However, it must be ensured that, to a large extent, digital functionalities can be used in order to form channel 2, thus no longer requiring dependence on the analog technology of a typical sensor basic chic.

Therefore, according to the invention, the second function block of the measurement value acquisition and the interface block are combined to a unit, thus making the interface block more intelligent, and executing the measurement value analysis and measurement value processing of the measurement value, which is redundant to the first channel of the first function block, in said interface block, and for the two measurement values to be subsequently compared in the CPU. In other words, the interface chip is designed with more complexity and receives the functions of measurement value acquisition and diagnosis of the second function block.

4$^{th}$ Embodiment

Separation in a Single Functional Unit

In the third embodiment, the measurement values redundant to each other are each combined in one channel in a single component (ASIC). The advantage of this measure is a substantial saving of space and space requirement and a high integration density.

5$^{th}$ and 6$^{th}$ Embodiment

Separation of the First Functional Unit into Two Functional Units

In the fifth and sixth embodiment, the first functional unit is separated into two functional units 1a and 1b, and the functional unit 3 is integrated in the interface hip 7$^{th}$ Embodiment Separation of the first functional unit into three functional units 1a, 1b, and 1c and integration of the functional unit 3 in the interface chip.

The subject matter of the present invention is not only the subject matter of the individual patent claims but also any combination of the individual patent claims.

Any and all statements and features disclosed in the documents, including the abstract, particularly the spatial embodiment shown in the drawings, are claimed as essential to the invention insofar as they are, individually or in combination, novel over the prior art.

In the following, the invention is described in detail using a number of types of embodiments shown in the drawings. Further features essential to the invention and advantages of the invention can be derived from the drawings and their descriptions.

At first, the function of the invention shall be described as an embodiment by means of an optical rotary encoder.

It is assumed that a rotary shaft is non-rotatably connected to an object to be measured, and the rotary shaft is connected to an optical disc with optical encoding.

It is known to encode the disc such that one track outputs the incremental measurement values, while absolute encoding tracks are to the left and right of the incremental track, and with which—independently from one another—absolute measurement values are acquired.

For example, said values are acquired by means of an optical reader, with which the incremental measurement values are acquired with a first acquisition device, and two other acquisition devices (e.g. photodiodes) acquire the two absolute values of the rotation angle which are identical but acquired independently from one another.

In other words, two absolute location values of the position transducer, which are redundant to one another, are acquired independently from one another as well as a corresponding redundant incremental location value.

Figure 1:
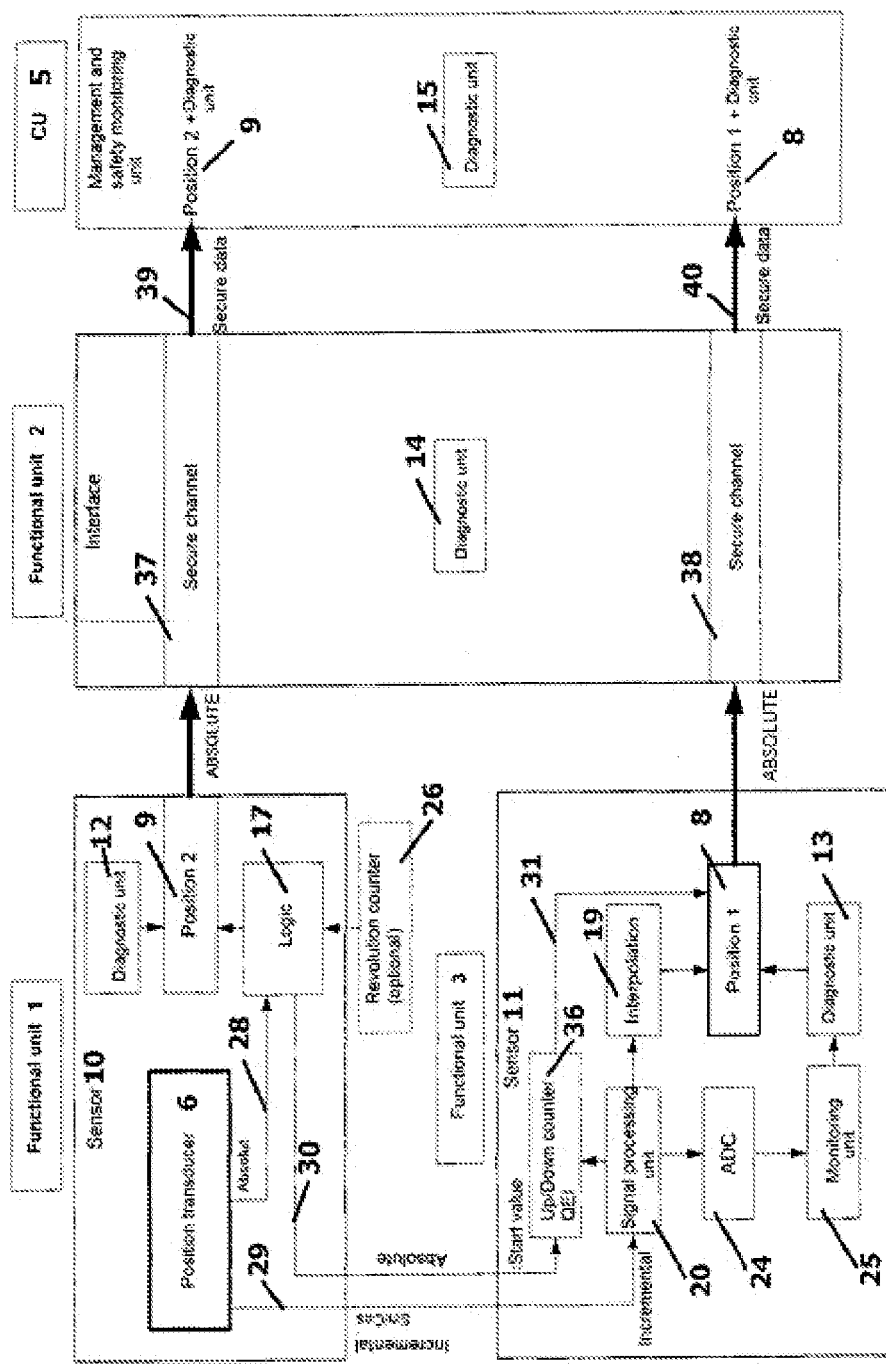
FIG. 1 shows a first embodiment of the separation of the measurement value acquisition into three functional blocks.

For example, the first absolute location value is used for calculating the location position 9 in FIG. 1, while the second absolute location value which is redundant to but independently acquired from the first location value, is used for calculating the location position 8 according to FIG. 1.

Instead of the transmission of two absolute location values which are redundant to one another but independently acquired, it also suffices, according to FIG. 1, to merely determine one single absolute location value in the position transducer 6, which also determines the incremental location value by means of a different channel.

The sensor 10 according to FIG. 1 thus consists of a position transducer 6, which was described above as reader of an optically scanned encoded disc, but to which the invention is not limited.

It goes without saying that the sensor 10 can also operate in accordance with the inductive, capacitive, or magnetic principle.

It is important that the position transducer 6 is associated with the sensor 10, said position transducer 6 feeding the incremental measurement values from the functional unit 1 to the separate functional unit 3 by means of the incremental path 29; from there it is fed to a signal processing unit 20.

By means of the path 28, the absolute measurement values are fed to a logic 17 in the functional unit 1, where a start value on the absolute path 30 is generated which controls an up/down counter 36.

Said up/down counter 36 is a quadrature encoder interface designed as a counter and which, by means of the path 30, receives a start value from the logic 17, into which the absolute location values are fed by means of the path 28.

The up/down counter 36 thus counts the incremental measurement values fed to the signal processing unit 20 and, by means of the path 31, feeds said values to the location position 8 which calculates an absolute location value from said values.

The calculation is effected by means of the output of the signal processing unit 20, which is acting on an interpolation chip 19, and also by means of the output of the signal processing unit 20 which digitalizes the incremental values by means of an analog-digital converter (ADC 24), feeds said values to a monitoring unit 25 which, in turn, is connected to a diagnostic unit 13, the output of which is integrated in the chip for calculating the absolute location value at the location position 1.

It is therefore important that, separate from the functional unit 1, a functional unit 3 is arranged, in which absolute values are calculated from the incremental values, which were obtained from the position transducer 6 arranged in the functional unit 1; these absolute values thus result from other ways of calculation, i.e. by comparison, the redundant absolute location values acquired in the location position 9.

This chip of the location position 2 is also associated with a diagnostic unit 12, and the logic 17 which can optionally be connected to a revolution counter 26 (multi-turn) in order to detect full revolutions.

For the embodiment according to FIG. 1, it is also essential that the two functional units 1 and 3 generate absolute location values which are redundant to one another by independent paths which each, independently from one another, also run, by means of secure channels 37, 38, through a functional unit 2 which is designed as interface.

Practically, the functional unit 2 is only provided with a diagnostic unit 14 and merely generates two parallel secure channels 37, 38 without having computational power. Therefore, the functional unit 2 can be designed as cost-effective chip which is available on the market as computational chip, and the entire circuit according to the embodiment of FIG. 1 can thus be constructed particularly cost-effectively.

Transmission through the functional unit 2 in the form of two parallel and functionally separate secure channels 37, 38 results in the feeding of the separate secure data 39, 40 to the control unit 5 by means of the secure channels 37, 38, said control unit being designed as management and safety monitoring unit. In said control unit, the absolute values acquired in the location positions 8 and 9 are processed separately from one another and, if applicable, are diagnosed in a diagnostic unit 15 and compared with one another.

In case of a deviation of the location positions 8, 9 which are redundant to one another, the control unit 5 deactivates the downstream-connected machine by means of a path not further specified.

Figure 2:
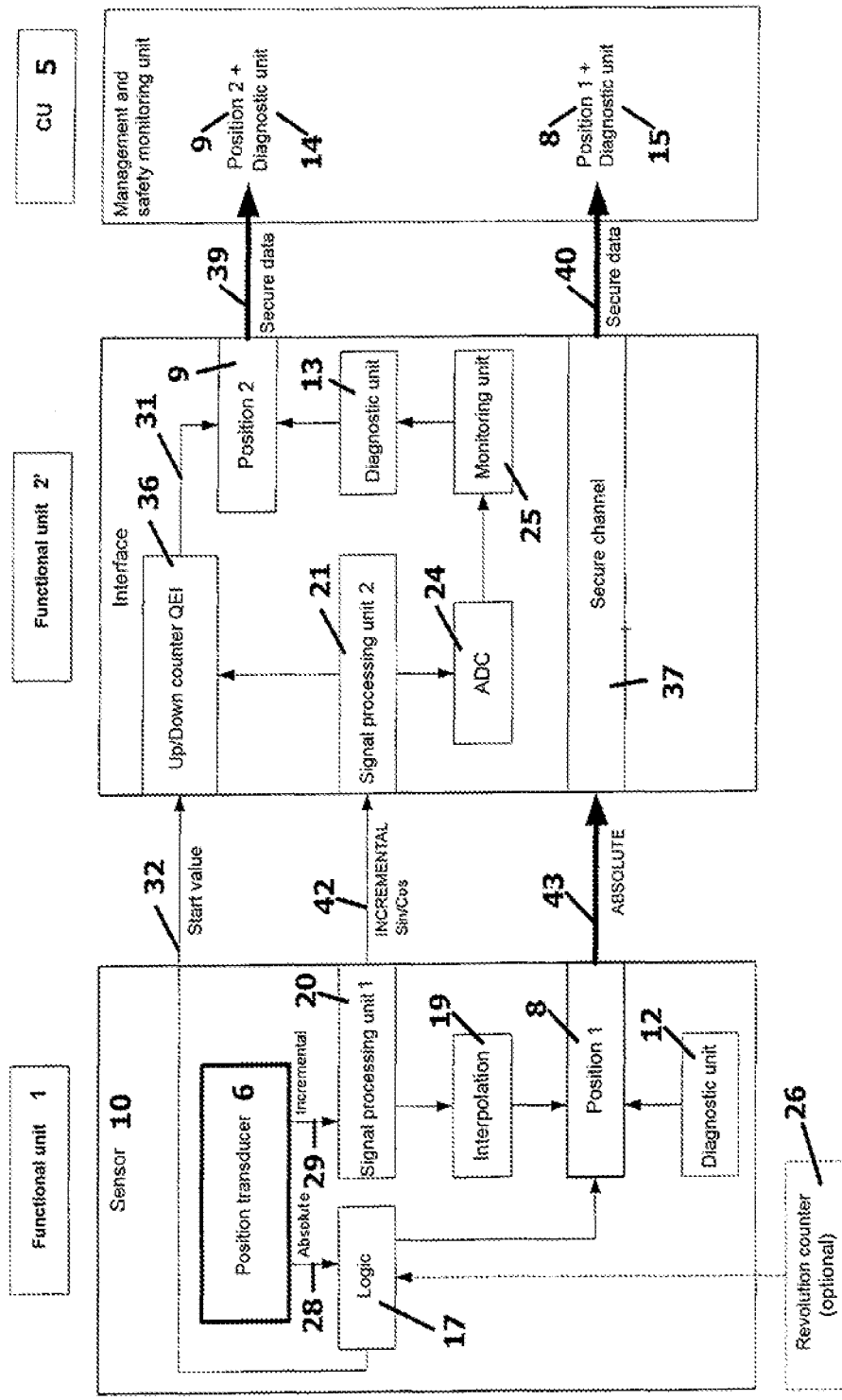
FIG. 2 shows a modification of the first embodiment of the separation of the measurement value acquisition into three functional blocks.

The embodiment 2 in FIG. 2 differs from the embodiment in FIG. 1 in that the functional unit 3 as separate ASIC chip is entirely omitted and that the functional unit 3 is instead integrated in the functional unit 2 as new functional unit 2'.

As a result, the interface block of the functional unit 2, shown in FIG. 1 in the first embodiment, is augmented with a higher intelligence because, according to the invention, all parts of the functional unit 3 are integrated in the functional unit 2 in this embodiment according to FIG. 2.

Therefore, the same reference signs denote the same parts. It is characterizing for this embodiment that only one secure channel 37 remains because only the one channel is fed from the location position 8, and the absolute measurement values 43 are fed as secure data 40 to the control unit 5 by means of the secure channel 37.

Since the functional unit 3 according to FIG. 1 is now integrated in the functional unit 2', the other secure channel 37 is no longer required. Instead, the location position 9 is now formed by the chips previously described by means of the functional unit 3, and at the output of location position 9, secure data 39 are thus fed to the control unit 5.

The described embodiment is advantageous because a higher level of integration is achieved when compared to the embodiment according to FIG. 1. Correspondingly, there is less space requirement and instead of three functional units, there are now only two functional units.

Figure 3:
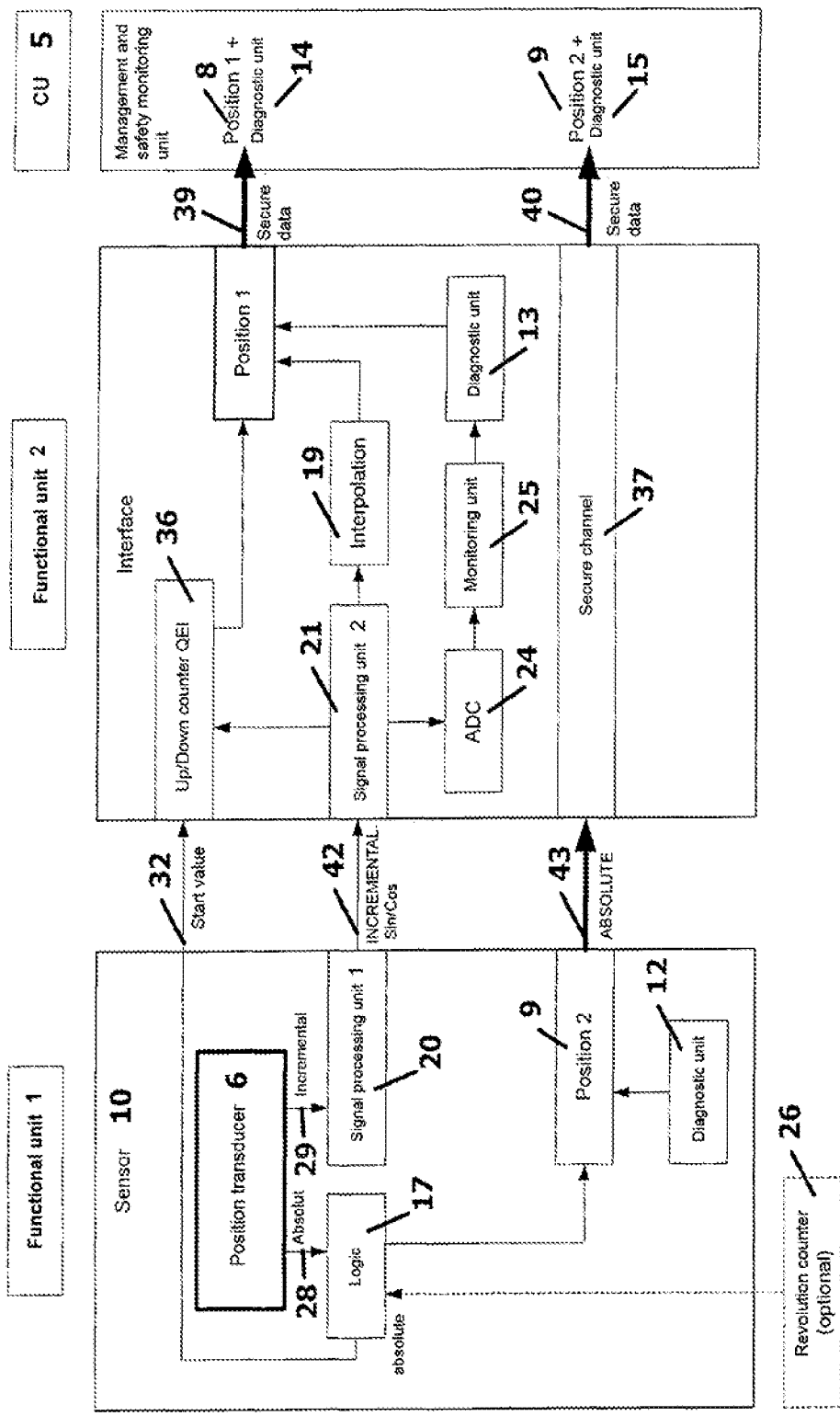
FIG. 3 shows a second embodiment of the separation of the measurement value acquisition into two functional blocks.

The embodiment according to FIG. 3 is substantially identical with the embodiment according to FIG. 2, except that the location position 9 is detected and calculated in the functional unit 1, while in the functional unit 2'', the location position 1 and the location position 8 are calculated from the incremental measurement values 42 in conjunction with a start value 32 fed to the up/down counter 36.

Moreover, the same reference signs denote the same parts and thus also the same description.

Figure 4:
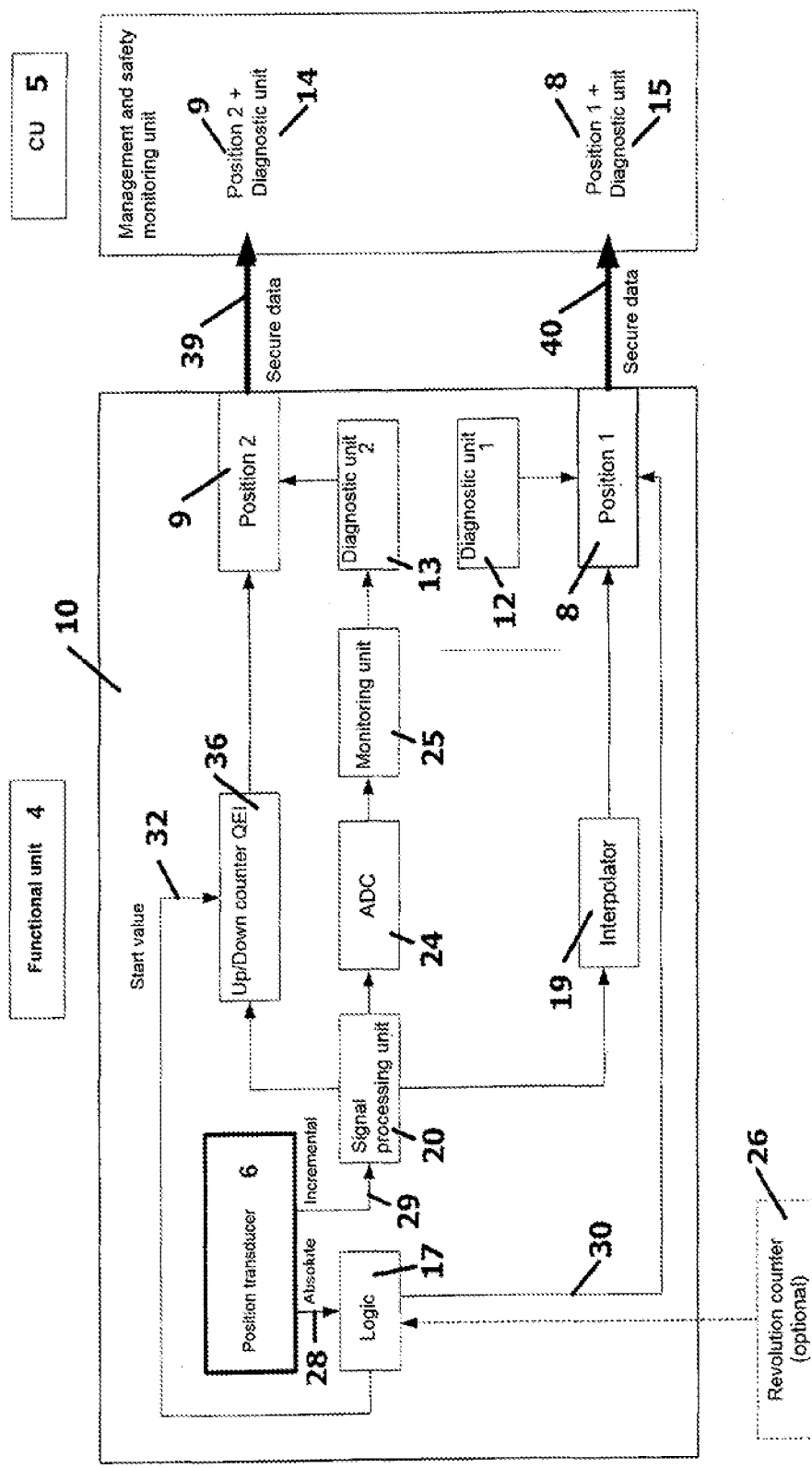
FIG. 4 shows a third embodiment of the consolidation of the measurement value acquisition into a single functional block.

In the embodiment according to FIG. 4, a new type of functional unit 4 is provided which is formed from the functional units 1 and 2' of FIGS. 2 and 3.

In other words, there is only one single functional unit which combines all previous embodiments according to FIGS. 1 to 3.

It is characterizing for the functional unit 4 that the location positions 8 and 9 are detected and/or calculated independently from one another in a single chip and transmitted to the control unit 5 as secure data 39, 40 which are redundant.

Figure 5:
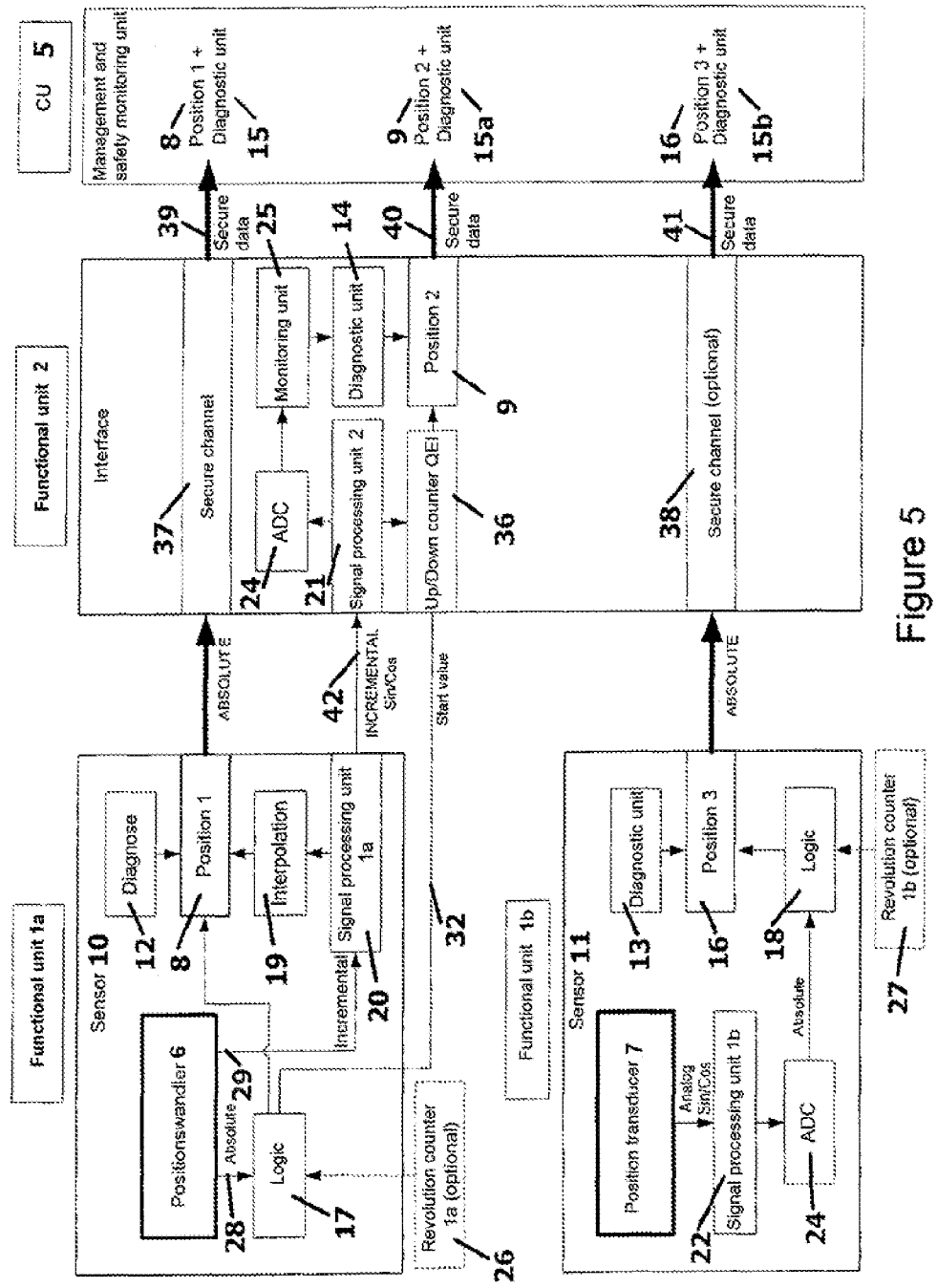
FIG. 5 shows a fourth embodiment of the separation of the measurement value acquisition into three functional blocks.

The embodiment according to FIG. 5 differs from the embodiment according to FIG. 1 in that a functional unit 1a receives the position transducer 6 and outputs the location position 8 as absolute value.

However, independently from the position transducer 6, a second position transducer 7 is provided which operates independently from the position transducer 6. The transmission of two absolute measurement values from an optically encoded disc was mentioned as embodiment at the beginning of the description of the drawings.

Relating to this embodiment, the position transducer 6 detects the one absolute value on the disc, which is arranged on a track of the encoded disc, while the position transducer 7 acquires the absolute values of the encoded disc from a different track.

In other words, there are two position transducers 6 and 7 which operate independently from one another.

Accordingly, the position transducer 6 generates the location position 8, while the position transducer 7 generates the location position 16.

Once again, both location values are fed as absolute values to the functional unit 2 which transmits the redundant absolute location values as secure data 39, 41 to the control unit 5 by means of two secure channels 37, 38.

In this embodiment, it is important that the functional unit 2 used as interface has a higher integration and a calculation circuit for calculating the location position 9 from the incremental measurement values 42 in conjunction with the up/down counter 36 and the ADC 24.

Figure 6:
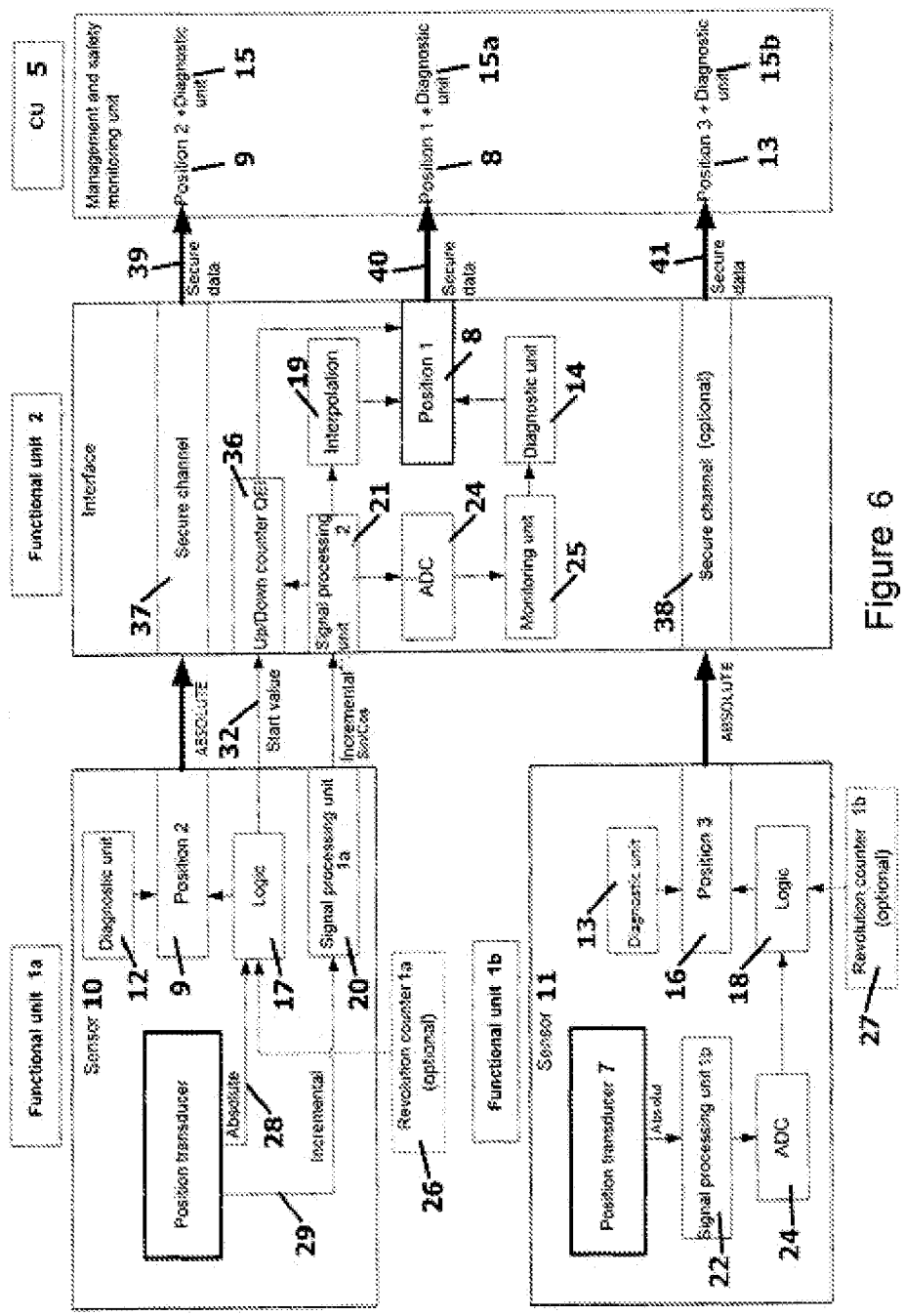
FIG. 6 shows a modification of the fourth embodiment of the separation of the measurement value acquisition into three functional blocks.

Analogously to FIG. 5, FIG. 6 shows only the reversal, i.e., the location position 8 is now acquired in the functional unit 2 by calculation from the incremental values, while the absolute location position 9 is detected and output by the position transducer 6.

Moreover, the same reference signs denote the same parts and thus also the same description.

Figure 7:
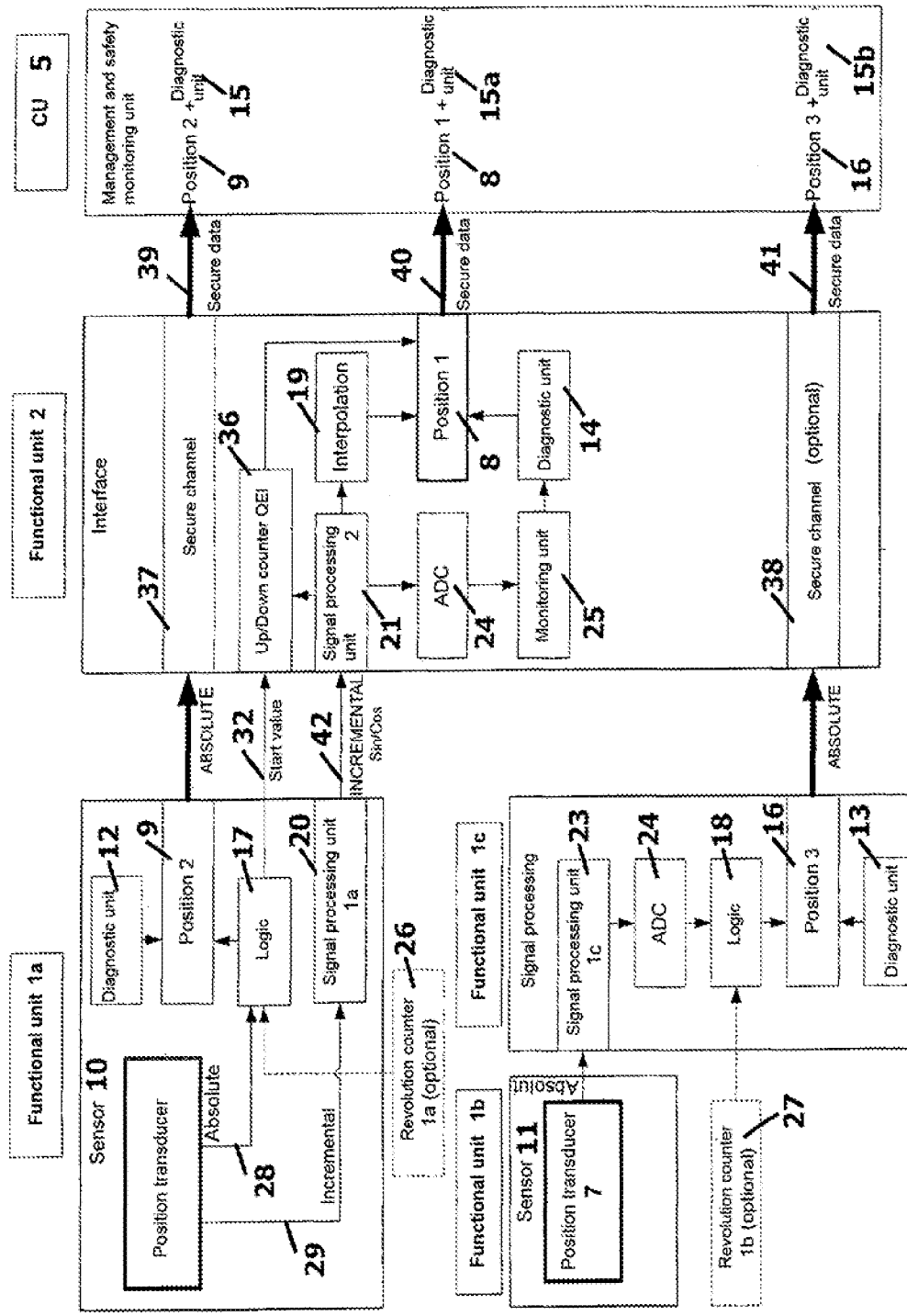
FIG. 7 shows a fifth embodiment of the separation of the measurement value acquisition into four functional blocks.

The embodiment according to FIG. 7 differs from the aforementioned embodiment in that the functional unit 1 is overall divided into three different functional units 1a, 1b, and 1c.

In FIGS. 5 and 6, the functional unit 1 was merely divided into the functional units 1a and 1b; however, according to FIG. 7, a separation into the functional units 1a, 1b, and 1c is provided.

This implies that one component (ASIC) each is assigned to each of the functional units 1a, 1b, and 1c, and thus four components overall are arranged and electrically interconnected on a printed circuit board.

Due to the separation of the functional unit 1 in altogether three sub-functional units 1a, 1b, and 1c, it is necessary, proceeding from the signal processing unit 23, to connect an ADC 24 in the functional unit 1c, which inputs its signals for calculation of the absolute value of the location position 16 by means of a logic 18.

This location position 16 is also checked by a diagnostic unit 13.

Therefore, similar to FIGS. 5 and 6, there are also two sensors 10, 11. However, in contrast to FIGS. 5 and 6, the sensor 11 in FIG. 7 is separated into two different function blocks 1b and 1c.

Accordingly, the absolute location position 16 is calculated from the sensor 11 and the associated position transducer 7 and fed as secure data 41 to the control unit 5 by means of the secure channel 38.

The interface for the arrangement of the secure channels 37 and 38 is also provided in the functional unit 2, wherein, however, said functional unit 2 is integrated higher because, proceeding from the position transducer 6 and the location position 9 determined at said position transducer 6, the location value also is calculated from the incremental measurement values 42 of the position transducer 6 in conjunction with a start value 32.

A signal processing unit 21 is also arranged in the functional unit 2, and in the case of the embodiment according to FIGS. 5 and 6, a further signal processing unit 22 was associated with the functional unit 1b.

The ADC 24 is required for a diagnosis in order to determine whether the acquired sine-cosine signals are still within a valid range, thus ensuring a safe count. Consequently, the incremental values are transmitted to the ADC, and, in accordance with the principle sine square+cosine square=constant, the thus acquired incremental values must fall within a specific window. This is determined by the monitoring component 25 and fed to a diagnostic unit 13.

The embodiments according to FIGS. 5 to 7 are characterized not only by a transmission by means of two secure channels 39, 40 but also by the addition of third secure channel 41 which further increases the safety of the data transmission because all secure data on all three channels are checked by the control unit 5.

In the embodiment according to FIG. 7, the functional unit 1 is divided into the sub-functional units 1b and 1c. The functional unit 1b is designed as sensor block, while the functional unit 1c is designed as signal processor block. Such a separation into a sensor block and a signal processor block (functional unit 1c) is favorable since the functional unit 1c can be designed as commercially available microprocessor, the cost of which is very low. Therefore, standardized components can be used and separate the sensor region with regard to the functional unit 1b from the signal processor region with regard to the functional unit 1c and functional unit 2.

Of course, it is also possible to apply the principle of separation into a sensor block and a signal processor block according to FIG. 7 to the functional unit 1a. Analogously, the position transducer 6 would then be arranged in a single functional unit, and the block to the right would then be designed as further signal processor unit with the diagnostic unit 12, the location position 9, logic 17, and signal processing unit 20 as separate signal processor block.

Moreover, the invention uses so-called secure protocols for transmitting data on the described channels for transmission to the control unit. Check bits or key information are associated with each data block, and so a development of the invention can provide for the arrangement of an encoding chip either in the functional unit 1 or its sub-functional units 1a, 1b, 1 c, and/or the functional unit 2, wherein said encoding chip transmits encoded data by means of the previously described channels and which are decoded and verified in the control unit 5.

LIST OF REFERENCE SIGNS

1 Functional unit 1
1a Functional unit 1
1b Functional unit 1
1c Functional unit 1
2 Functional unit 2
2' Functional unit 2+
3 Functional unit 3
4 Functional unit
5 Control unit CU
6 Position transducer
7 Position transducer
8 Location position 1
9 Location position 2

10 Sensor
11 Sensor
12 Diagnostic unit
13 Diagnostic unit
14 Diagnostic unit
15 Diagnostic unit a, b
16 Location position 3
17 Logic
18 Logic
19 Interpolation
20 Signal processing unit 1
21 Signal processing unit 2
22 Signal processing unit 1b
23 Signal processing unit 1c
24 ADC
25 Monitoring unit
26 Revolution counter 1a
27 Revolution counter 1b
28 Path absolute
29 Path incremental
30 Path absolute
31 Path
32 Start value
34
35
36 Up/down counter
37 Secure channel
38 Secure channel
39 Secure data
40 Secure data
41 Secure data
42 Incremental measurement values
43 Absolute measurement values

The invention claimed is:

1. Method for operating a multi-channel rotary encoder comprising at least one printed circuit board on which one or a plurality of functional units (1, 1a, 1b, 1c, 2, 3, 4) are arranged as integrated components and are interconnected, at least one position transducer (6, 7) generating absolute and incremental measurement values which are each fed to a control unit (5) by means of at least one channel (37, 38), the control unit being disposed as a management and safety monitoring unit and controlling a downstream-connected machine, characterized in that the rotary encoder consists of at least three functional units (1, 2, 3), that the position transducer (6) is arranged in a first functional unit (1) and generates absolute location-position values (9) in this functional unit (1), which are fed by a second functional unit (2), which is connected as an interface, as first secure data (39) by means of the first secure channel (37) to the control unit (5), and that the position transducer (6) feeds its incremental measurement values to a third functional unit (3) which generates absolute location-position values (8) by calculation and feeds said values (8) through the second functional unit (2) by means of a second secure channel (38) as second secure data (40) to the control unit (5) (FIG. 1).

2. Method for operating a multi-channel rotary encoder comprising at least one printed circuit board on which one or a plurality of functional units (1, 1a, 1b, 1c, 2, 3, 4) are arranged as integrated components and are interconnected, at least one position transducer (6, 7) generating absolute and incremental measurement values which are each fed to a control unit (5) by means of at least one channel (37, 38), the control unit being disposed as a management and safety monitoring unit and controlling a downstream-connected machine, characterized in that the rotary encoder consists of at least two functional units (1, 2), that the position transducer (6) is arranged in a first functional unit (1) and generates absolute and incremental position values (42, 43) as first location-position values (8 or 9) in this functional unit (1), and that said position values (42, 43) are fed by a second functional unit (2) to the control unit (5) as first secure data (39) by means of a secure channel (37), and that second location-position values (9 or 8) are calculated in the second functional unit (2) from the incremental measurement values of the first functional unit (1) and fed to the control unit (5) as secure second data (40) (FIGS. 2, 3).

3. Method for operating a multi-channel rotary encoder comprising at least one printed circuit board on which one or a plurality of functional units (1, 1a, 1b, 1c, 2, 3, 4) are arranged as integrated components and are interconnected, at least one position transducer (6, 7) generating absolute and incremental measurement values which are each fed to a control unit (5) by means of at least one channel (37, 38), the control unit being disposed as a management and safety monitoring unit and controlling a downstream-connected machine, characterized in that the rotary encoder consists of one functional unit (4), in which the position transducer (6) is arranged, which generates absolute and incremental position values (28, 29) which are converted in location-positions (8, 9) which are redundant to one another and are fed to the control unit (5) as secure data (39, 40) by means of two channels (FIG. 4).

4. Method for operating a multi-channel rotary encoder comprising at least one printed circuit board on which one or a plurality of functional units (1, 1a, 1b, 1c, 2, 3, 4) are arranged as integrated components and are interconnected, at least one position transducer (6, 7) generating absolute and incremental measurement values which are each fed to a control unit (5) by means of at least one channel (37, 38), the control unit being disposed as a management and safety monitoring unit and controlling a downstream-connected machine, characterized in that the rotary encoder consists of at least three functional units (1a, 1b, 2), that a first position transducer (6) is arranged in a first functional unit (1a) and generates absolute location-position values (9) in this functional unit (1a), which are fed by a second functional unit (2), which is connected as an interface, as first secure data (39) by means of the first secure channel (37) to the control unit (5), and that a second position transducer (7) is arranged in a second functional unit (1b) and detects third absolute location positions (16) and feeds said absolute location positions (16) to the control unit (5) by means of a third secure channel (38), and that the incremental position values (42) from the first functional unit (1a) are converted to absolute location-position values (9) in the second functional unit (2), which is connected as an interface, said absolute location-position values (9) being fed to the control unit (5) as second secure data (40) (FIGS. 5, 6).

5. Method for operating a multi-channel rotary encoder comprising at least one printed circuit board on which one or a plurality of functional units (1, 1a, 1b, 1c, 2, 3, 4) are arranged as integrated components and are interconnected, at least one position transducer (6, 7) generating absolute and incremental measurement values which are each fed to a control unit (5) by means of at least one channel (37, 38), the control unit being disposed as a management and safety monitoring unit and controlling a downstream-connected machine, characterized in that the rotary encoder consists of at least four functional units (1a, 1b, 1c, 2), that a first position transducer (6) is arranged in a first functional unit (1a) and generates absolute location-position values (9) in this functional unit (1a), which are fed by a second functional unit (2), which is connected as an interface, as first secure data (39) by means of the first secure channel (37) to the control unit (5), and that a second position transducer (7) is arranged in a second functional unit (1*b*) and detects and processes third absolute location positions (16) and feeds said absolute location positions (16) to a third functional unit (1*c*) designed as signal processor unit, which calculates an absolute location position (16) and feeds said absolute location position (16) to the control unit (5) by means of a third secure channel (38), and that the incremental position values (42) from the first functional unit (1*a*) are converted to absolute location-position values (9) in the second functional unit (2), which is connected as an interface, said absolute location-position values (9) being fed to the control unit (5) as second secure data (40) (FIG. 7).

* * * * *